(12) United States Patent
McLaughlin et al.

(10) Patent No.: US 7,881,535 B1
(45) Date of Patent: Feb. 1, 2011

(54) SYSTEM AND METHOD FOR MANAGING STATISTICAL MODELS

(75) Inventors: Kevin McLaughlin, Doswell, VA (US); Dennis Gallagher, Tampa, FL (US)

(73) Assignee: Capital One Financial Corporation, McLean, VA (US)

( * ) Notice: Subject to any disclaimer, the term of this patent is extended or adjusted under 35 U.S.C. 154(b) by 1252 days.

(21) Appl. No.: 11/478,213

(22) Filed: Jun. 29, 2006

(51) Int. Cl.
*G06K 9/18* (2006.01)
*G06F 17/10* (2006.01)

(52) U.S. Cl. .......................... 382/186; 703/2
(58) Field of Classification Search ................. 382/100, 382/186; 703/2; 705/7, 10, 38; 706/50, 706/925; 707/600, 741, 776; 717/101, 120, 717/170
See application file for complete search history.

(56) References Cited

U.S. PATENT DOCUMENTS

| | | | |
|---|---|---|---|
| 6,173,276 B1 * | 1/2001 | Kant et al. ..................... 706/50 |
| 6,920,458 B1 * | 7/2005 | Chu et al. ..................... 707/600 |
| 7,149,699 B2 * | 12/2006 | Barnard et al. ................. 705/7 |
| 2002/0038228 A1 | 3/2002 | Waldorf et al. |
| 2002/0194119 A1 | 12/2002 | Wright et al. |
| 2004/0205045 A1 | 10/2004 | Chen et al. |
| 2004/0220784 A1 | 11/2004 | Stephenson et al. |
| 2005/0228767 A1 | 10/2005 | Ramsey et al. |
| 2005/0234753 A1 | 10/2005 | Pinto et al. |
| 2005/0234761 A1 | 10/2005 | Pinto et al. |
| 2005/0234763 A1 | 10/2005 | Pinto et al. |
| 2005/0234902 A1 | 10/2005 | Meredith et al. |
| 2005/0256818 A1 | 11/2005 | Sun et al. |

* cited by examiner

*Primary Examiner*—Abolfazl Tabatabai
(74) *Attorney, Agent, or Firm*—Baker & McKenzie LLP

(57) ABSTRACT

A plurality of users may access a processing unit operable for the development of a model, and model development instructions from the users may be received at the processing unit. The model may be developed in a plurality of steps using the model development instructions. Signoff instructions corresponding to the steps for developing the model may be received at the processing unit, each of the signoff instructions being received after each corresponding step is performed, with each of the plurality of signoff instructions indicating approval or denial. The respective step may be approved by the processing unit if the corresponding signoff instruction indicates approval, and rejected by the processing unit if the corresponding signoff instruction indicates denial. The processing unit is operable as a central location accessible by the users for developing, and signing off on the development of, the model according to the development instructions and the signoff instructions.

21 Claims, 4 Drawing Sheets

SYSTEM AND METHOD FOR MANAGING STATISTICAL MODELS

FIELD

The present application relates to systems and methods for managing models such as statistical models, and more particularly to systems and methods for approval tracking, performance monitoring, documenting, and reporting tasks associated with statistical model development and utilization.

BACKGROUND

Entities, such as financial institutions, may utilize a large number of statistical models in the performance of business operations. The statistical models may be utilized as tools in decision-making processes, and the business operations may include, for instance, granting of loans, marketing, opening of accounts, extending credit, processing of payments, soliciting new customers, and the like. The statistical models may be used in the performance of those business operations to guide business analysis and provide indications of probabilities of success of the operations, in light of various relevant financial, individual, and environmental variables.

Such statistical models may be extremely complex and may include a plurality of mathematical equations and/or relationships, each associated with a plurality of variables. Further, development of such statistical models may require coordination of effort and communication amongst a large number of individuals (collaborators). The collaborators may be located in disparate geographical regions, and each collaborator may have distinct duties that require simultaneous transmission of data from other collaborators. Additionally, development and implementation of the statistical models may require the generation, distribution, and management of large quantities of printed and electronic documentation.

Conventional methods for statistical model development and management therefore require collection, organization, and transmission of a large quantity of independent pieces of paper and electronic documentation, as well as complicated management of schedules and communication of collaborators. Collaborators may need to be appraised of schedules and statuses of other collaborators, and each collaborator may need to be alerted of statuses of required tasks. The statistical model development procedures may require that the collaborators manually coordinate development schedules, relay status information, transport documentation, and alert other collaborators regarding necessity of additional activity. Each of the above tasks may be required to be performed several times for each of a large number of collaborators. Such a required level of complexity and manual information management and transmission is extremely cumbersome, inefficient, prone to errors, and may introduce opportunities for loss of documentation, experimental data, and other important information.

Accordingly, a need exists for methods and systems for managing such schedules, documentation, data, alerts, and other information associated with development and implementation of models.

SUMMARY

An aspect of the present application provides for a method for managing development of a model, comprising accessing by a plurality of users a processing unit operable for the development of the model, receiving at the processing unit a plurality of model development instructions from the plurality of users, developing the model in a plurality of steps using the plurality of model development instructions, receiving at the processing unit a plurality of signoff instructions corresponding to the plurality of steps for developing the model, each of the plurality of signoff instructions being received at the processing unit after the corresponding one of the plurality of steps is performed and each of the plurality of signoff instructions indicating whether the respective step is approved or denied, approving by the processing unit a respective step if the corresponding signoff instruction indicates approval, and rejecting by the processing unit the respective step if the corresponding signoff instruction indicates denial, wherein the processing unit is operable as a central location accessible by the plurality of users for developing, and signing off on the development of, the model according to the plurality of model development instructions and the plurality of signoff instructions.

Another aspect of the present application provides for a computer-implemented method for management of a model, comprising accessing by a plurality of users a processing unit operable for the management of the model, receiving at the processing unit model implementation information, receiving at the processing unit model documentation review information, receiving at the processing unit a plurality of signoff instructions corresponding to each of the implementation information and the documentation review information, approving by the processing unit an implementation of the model if the corresponding signoff instruction indicates approval, and rejecting by the processing unit the implementation if the corresponding signoff instruction indicates denial, approving by the processing unit a utilization of the model if the corresponding signoff instruction indicates approval, and rejecting by the processing unit the utilization if the corresponding signoff instruction indicates denial, wherein the processing unit is operable as a central location accessible by the plurality of users for implementing and utilizing, and signing off on the implementation and utilization of, the model according to the implementation information, the documentation review information, and the plurality of signoff instructions.

A further aspect of the present application provides for a statistical model management system, comprising at least one processing unit, at least one information storage repository, a statistical model management application running on the at least one processing unit, wherein the at least one processing unit is operable for the management of the model and is operable to facilitate access by a plurality of users, receive a plurality of model management instructions from the plurality of users, manage the model in a plurality of steps using the plurality of model management instructions, receive a plurality of signoff instructions corresponding to the plurality of steps for managing the model, each of the plurality of signoff instructions being received at the processing unit after the corresponding one of the plurality of steps is performed and each of the plurality of signoff instructions indicating whether the respective step is approved or denied, approve a respective step if the corresponding signoff instruction indicates approval, reject the respective step if the corresponding signoff instruction indicates denial, and the at least one processing unit is operable as a central location accessible by the plurality of users for managing, and signing off on the management of, the model according to the plurality of model management instructions and the plurality of signoff instructions.

BRIEF DESCRIPTION OF THE DRAWINGS

Embodiments of the present application are illustrated by way of example in the accompanying figures, in which like reference numbers indicate similar elements, and in which.

DETAILED DESCRIPTION

Figure 1:
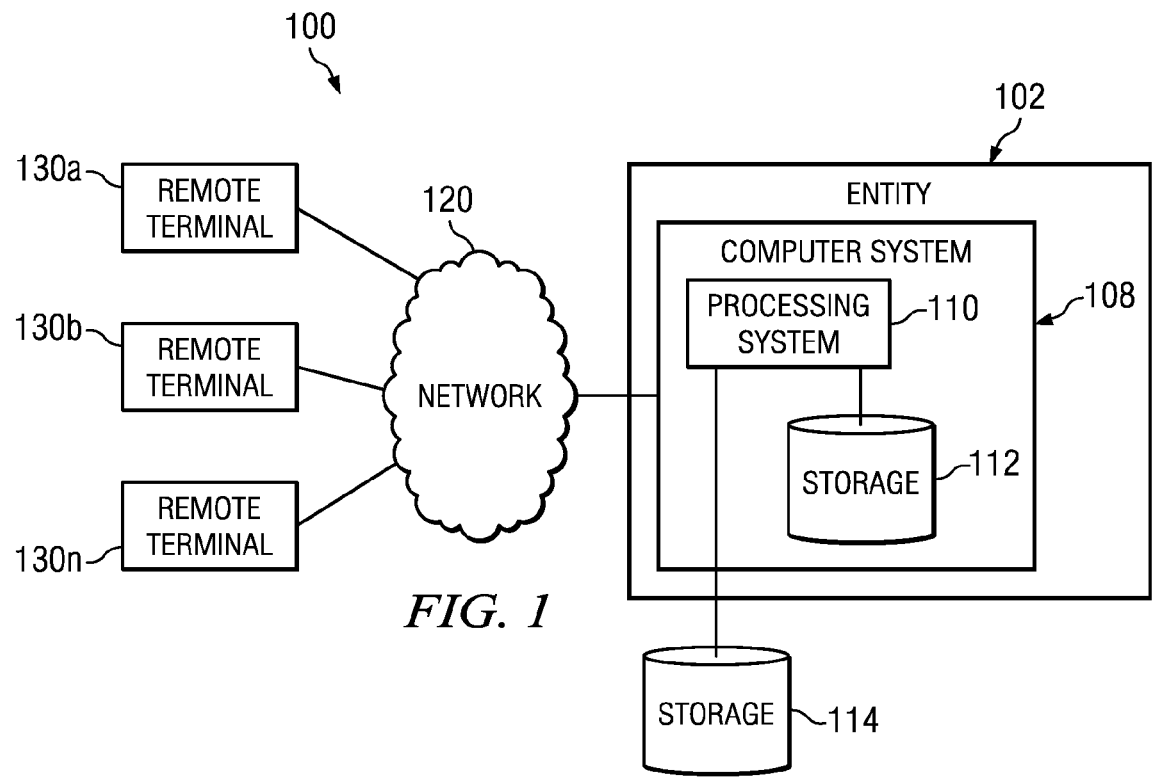
FIG. 1 shows an exemplary model management system according to the exemplary embodiments of the present application.

The exemplary embodiments of the present application relate to systems and methods for managing the development of models, including for instance, approval tracking, documenting, alert generation, reporting, and information storage. These systems and methods also manage the utilization of the developed models, including for example, documenting, producing documentation and reports, status changing, and modification. The present application is not limited to any specific type of model. For example, the model can be a statistical model for any application, such as financial, pharmaceutical, or other suitable application.

Statistical models may be utilized in the performance of decision-making processes in a large variety of management operations. The statistical models may relate to, for instance, prediction of behavior of financial systems and/or persons based upon data including a variety of variables and other relevant identification and/or environmental data.

The statistical models may be structured in a plurality of forms, depending upon a business problem or other need to which the statistical model is directed. In an exemplary embodiment, for example, a statistical model may be used to assist prediction of an approximate likelihood or probability that a customer of a financial institution will repay a loan or a credit extended through a line of credit, will respond to a solicitation or communication, and the like. The statistical model may include one or more mathematical equations or relationships that may provide guidance or estimates regarding a relative probability that a customer or group of customers will act in a particular way or perform one or more particular actions. As will be understood by one skilled in the art, any of the exemplary statistical models may be applied to one or to several customers.

One or more variables may be incorporated into the statistical models, and the quantity and values of the variables may depend upon a type of the statistical model. Exemplary variables that may be incorporated into a financial statistical model, for instance, may be associated with income information of the customer, information associated with existing loans or credit carried by the customer, information associated with existing mortgage debt carried by the customer, information indicating whether the customer is employed, and if employed, a type of employment, and the like. Additional exemplary variables may include a debt-to-income ratio of the customer, a length of time as a customer, inclusion of the customer in a periodical subscription list, a number of open credit card accounts, a homeowner status of the customer, a prior credit history of the customer, a purchase history of the customer, and the like. As will be understood by one skilled in the art, the variables and information described above are merely exemplary, and any suitable variable may be incorporated into the statistical models of the present application.

Another exemplary statistical model includes a fraud detection statistical model for assisting in detection of fraud such as financial fraud, identity fraud, and the like. Financial fraud may be identified, for instance, through analysis of a plurality of variables such as a geographical location of financial transactions, geographical location of a residence and/or employment of a participant in a financial transaction, a value of a transaction, a time and/or date of a transaction, a type of product involved in the transaction, a financial status of a participant in a transaction, and the like.

The fraud may be identified, for instance, through analysis of one or more variables, and identification of inconsistencies and/or incongruities between expected transaction information and observed transaction information. For example, a customer may have a transaction history indicating the purchase of a particular type or class of item within a specific geographical region using a particular transaction account. An inconsistency such as transaction information indicating a purchase of that type or class of item in a geographically-remote location with the transaction account may indicate the presence of fraud. Similarly, purchase of an item that is inconsistent with the item or class of item historically purchased may indicate the presence of fraud.

The statistical model may also include a customer solicitation statistical model for efficiently selecting prospective customers for solicitation efforts. A customer solicitation statistical model may include variables such as, for instance, a number of past solicitations sent to customers, dates and/or times of past solicitations, favorable or unfavorable responses of customers to past solicitations, or any other pertinent data regarding solicitations sent to prospective customers. For example, a number and/or type of solicitations mailed, along with a date of mailing of each solicitation, within a particular geographical region may be monitored. These data may then be combined with other relevant information, such as demographic information associated with solicitation recipients, geographic residence and/or employment information of the recipients, financial information of the recipients, and the like. Quantities of successful responses and unsuccessful responses may be compared with a number of solicitations performed to derive, for example, a metric describing an overall success of the solicitations in obtaining responses from prospective customers.

The success metric or results of the mailing may be adjusted or modified in accordance with adjustment factors, to account for characteristics of the mailing effort, such as the information regarding the recipient, dates and locations of the mailings, products associated with the solicitations, and the like. The success metrics or results of the solicitations may additionally be compared to success metrics or results of other solicitations performed under different conditions, such as to a different set of recipients having different demographic or other characteristics, solicitations performed at different times and/or dates, and the like. Such a comparison may assist in determining probabilities of success of subsequent solicitations, or in identifying suitable modifications to solicitations to obtain higher rates of favorable reception by prospective customers.

As will be understood by one skilled in the art, a very large number of variables may be included, studied, varied, combined, and compared utilizing such a statistical model.

Additional statistical models may be included. For instance, in alternative exemplary embodiments the statistical models may include an attrition model for predicting when a customer may voluntarily cancel an account, or a value statistical model for predicting a financial value of the customer over a period of time, such as a period of time of holding an account, a transaction card, and the like. Additional exemplary embodiments may include a cross-sell statistical model that may be utilized for predicting a likelihood that a customer may purchase a product related to an account of the customer, or a collections statistical model that may be utilized to predict an optimal time to call a collections account, for instance based on a probability that the accountholder may answer the call at a particular time.

In an exemplary embodiment, statistical model management is performed in association with a statistical model management system 100 as shown in FIG. 1. The model management system 100 includes an entity 102, for instance, a financial entity that provides financial services associated with establishment, maintenance, and usage of accounts. The entity 102 may include, for example, a financial entity such as a bank, a brokerage, a mortgage company, a credit union, or a transaction card issuer, such as a credit card issuer. The accounts may be transaction accounts, deposit accounts, and/or credit accounts associated with a secured or unsecured line of credit. Alternatively, the accounts may include home equity line of credit ("HELOC") accounts, brokerage accounts, and the like.

An exemplary statistical model management system 100 of the present application may include software programs and/or routines for management of statistical models and information associated with statistical models, stored in and executed, for example, by a computer system 108 associated with the entity 102, and each software program and/or routine may be capable of performing communication with other computer systems in conjunction with conventional computer communication hardware and software. The other computer systems may be associated with entity 102 or with one or more entities independent of entity 102. Communication between the computer systems may be performed via communication network 120, and the network 120 may include a public communication network such as the Internet, a private communication network separate from and independent of a public communication network, or a combination thereof. Additionally, the terms "computer system" and "network" as used herein may include a variety of combinations of fixed and/or portable computer hardware, software, peripherals, and storage devices.

The computer system 108 may include a plurality of individual components that may be networked or otherwise linked to perform collaboratively, or may include a single, stand-alone component having physically-integrated components. The computer system 108 associated with the entity 102 may further include a processing system 110, at least one internal storage device 112, and at least one external storage device 114. The storage devices may include dedicated storage servers, storage-area networks, RAID configurations, and the like. The external storage device 114 may include remote storage managed by an entity independent of entity 102.

In an exemplary embodiment, the one or more storage devices may be utilized as a storage repository for storing information associated with the development of the statistical models and information associated with managing utilization of these models. The storage repository may include, for instance, one or more database and/or relational database software applications operable for storing, organizing, indexing, and searching the stored statistical model information. The database software applications may include, for example, applications associated with DB/2, Oracle, and other database software, and may be run on dedicated database repository computer systems, or incorporated within the computer system 108 and/or the remote terminals 130a-130n. Configuration, operation, and utilization of database and/or relational database software applications is well-known in the art, and therefore is not described in greater detail herein.

In an exemplary embodiment, information associated with a statistical model may be categorized as "metadata," and may be processed by one or more statistical model management software applications and stored in the storage repository. The statistical model metadata may include, for example, identification information of collaborators performing development tasks associated with the statistical model, times and/or dates of performance of the tasks, locations of performance of the tasks, documentation associated with the statistical model, notes and miscellaneous information produced by the collaborators, and the like.

The computer system 108 may also include other computer system components that are well-known in the art, including a random-access memory, one or more hard drive devices, and peripherals such as keyboards, mice, and monitors for enabling input and output of information to and from the computer system 108. Software routines and/or programs may be embedded and/or stored in the internal storage device 112 or the external storage device 114 and may be run by the processing system 110. Additionally, the computer system 108 may be capable of network communication over wired or wireless communication lines, and may include associated hardware devices operable for transmitting, receiving, and routing electronic data, such as routers, switches, hubs, interfaces, and the like. The hardware and software components of the computer system 108 of the present application may include and may be included within fixed and portable devices including desktop, laptop, server, personal digital assistant, smart phone, clock, television, radio, and audio and video recording devices.

The statistical model management system 100 may additionally include one or more remote terminals 130a-130n. The remote terminals may include, for instance, personal computers, workstations, personal digital assistants (PDAs"), and the like, and the remote terminals 130a-130n may communicate with computer system 108 via network 120. Any suitable number of remote terminals 130a-130n may be utilized, and each remote terminal may run statistical model software applications and/or modules capable of interfacing with the statistical model management software applications and/or modules running on computer system 108. In an exemplary embodiment, the remote terminals 130a-130n may be positioned in geographically-remote locations with respect to entity 102. Alternatively, the remote terminals 130a-130n may be located near or within entity 102.

The statistical model management methods of the present application may include tasks performed by a plurality of collaborators, and each collaborator may include a single individual or a plurality of individuals included within user groups and operating in coordination. The collaborators may be located near or within entity 102, or may be located remotely. Each collaborator may utilize one or more remote terminals 130a-130n, and may communicate with computer system 108 or with other collaborators via communication network 120.

In an exemplary embodiment, for example, the user groups may include a "model owner" user group, a "model quality reviewer" user group, an "implementer" user group, and a "model owner champion" user group. The present application, however, is not limited to these user groups.

The model owner user group may include, for example, one or more individuals that perform analysis and computations utilizing mathematical and statistical resources to derive the equations and/or mathematical relationships of the statistical models. The model owner user group may also be responsible for construction of the statistical models.

The model quality reviewer user group may include, for instance, one or more individuals responsible for reviewing, supervising, and/or monitoring statistical model development and implementation. The model quality reviewer user group may additionally be responsible for reporting to relevant organizational and/or governmental authorities regarding compliance of the statistical model to applicable regulations.

The implementer user group may include, for instance, one or more individuals responsible for implementation of the statistical models in a production environment, and for integration of the statistical models with other computerized systems, databases, and/or financial transaction processing systems in an operational context.

The model owner champion user group may include, for instance, one or more individuals responsible for monitoring the implementation and/or functioning of the statistical models on a periodic basis. The functioning may relate to performance of the statistical model in production, and the periodic basis may include recurring time periods, such as daily, weekly, monthly, quarterly, annually, and the like.

Figure 2:
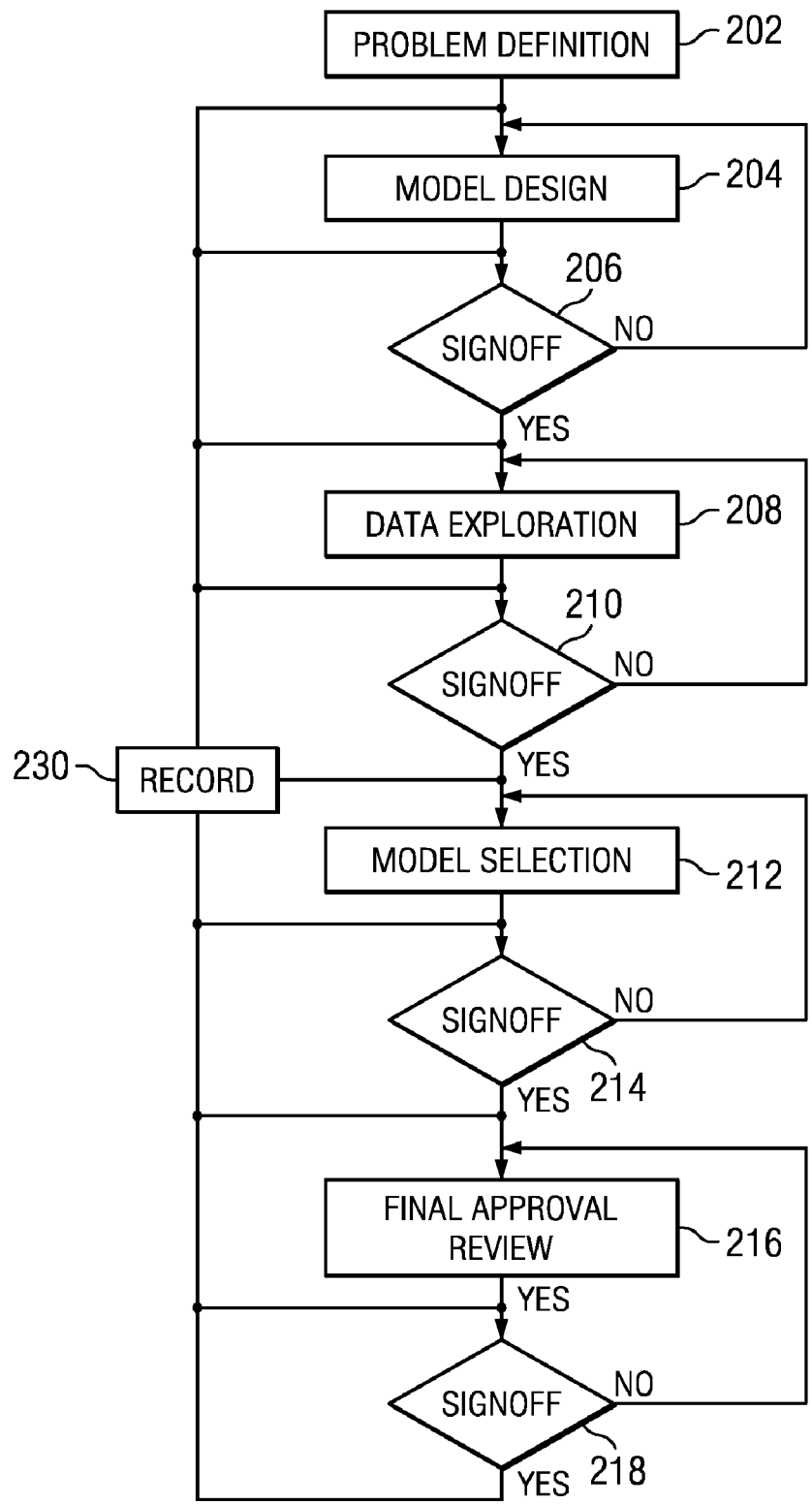
FIG. 2 is a flow diagram illustrating an exemplary method for development of a model according to the exemplary embodiments of the present application.

Referring to FIG. 2, in an exemplary embodiment, development of the statistical model may include a plurality of steps, including defining a business need, designing a statistical model to address that need, exploring data associated with that need, selecting a model, and approving the respective parts of the designed model and the final model. In an exemplary embodiment, each of the steps of the statistical model development may be defined by one or more statistical model development policies. The one or more development policies provide guidelines, requirements, and rules that must or should be followed in development of the statistical model.

Development of a statistical model begins with defining of a business need, such as a problem to be solved, at step 202. The problem definition may contain guidelines, rules, and objectives to be accomplished by the statistical model under development. Exemplary business problems may relate, for example, to prediction of customer behavior, detection of fraud, or efficiency of solicitation, as described herein. Upon completion of step 202, the defined problem along with any information used in order to define the problem may be entered into the statistical model management software application, processed by that application, and recorded to the storage repository 112, 114, at step 230. The definition of the business problem may include analysis and/or processing of business information that can be used to define business operations, such as business objective information, sales projection information, revenue information, cost information, tax information, advertising effectiveness information, and/or fraud occurrence information.

Definition of the business problem may include analysis of various types of information, such as business plan information, product strategy information, focus group result information, and information obtained from other suitable sources. The analyzed information may be obtained through research, internal meetings, planning sessions, and competitive analyses. The business problem definition may include a clear and thorough statement of a problem that a statistical model may be designed to solve.

The defined business problem along with any information used in order to define the problem may be entered into the statistical model management software application, processed by that application, and recorded to the storage repository 112, 114. The statistical model management software application may be run on the computer system 108 of the entity 102, and may be accessed through the communication network 120. In an exemplary embodiment, the access may be performed by using one or more of the remote terminals 130a-130n. Alternatively, the access may be performed via any suitable communication device capable of communication with the computer system 108 via the network 120.

The information entered into the information repository 112, 114 may be accessible by any of the individuals included in the plurality of user groups. The information repository 112, 114 may therefore serve as a central location for information used by any of the individuals that design and/or implement the statistical model. For instance, individuals of the model owner group may access the stored information, and use the accessed information to perform other model development steps, such as model design, data exploration, model selection, and final model approval. Additionally, individuals of the model owner group may access the stored information through the statistical model software application to perform signoff steps of the statistical model development process.

After completion of the problem definition step 202, the statistical model may be designed at step 204. The model design may provide a conceptual framework of how the statistical model may be constructed, and of how the constructed statistical model may solve the business problem defined at step 202. In an exemplary embodiment, the model design step 204 may include determination of a sample population to be used in statistical model construction, identification of available data sources, identification of methods for validation of the statistical model, determination of a timeline for completion of the statistical model completion, identification of analytic approaches that may be utilized for statistical model construction, and the like, in light of the business problem defined at step 202. For instance, the model design step 204 may include discussions focused on description of the business problem, and identifying whether a statistical model applicable to that business problem may be constructed.

Upon completion of step 204, information and/or metadata utilized during the performance of step 204 IS recorded to the storage repository, at step 230. The recorded information may include, for instance, identification information of collaborators associated with designing the statistical model, a description of the statistical model at a time and/or date of performance of step 204, and any other relevant information suitable for describing the performance of step 204.

Recordation of relevant information may be performed at various points throughout the statistical model development process, as described below. The recorded information may relate to statistical model development steps and to signoff steps. The recorded information may allow, for instance, for the performance of audits or reviews of the statistical model development process at a later date, or may provide a framework for reconstructing the statistical model and/or statistical model development process at a later date.

Additionally, the information stored to the repository may be presented to relevant organizational and/or governmental authorities pursuant to applicable laws or regulations. For example, organizational regulations may relate to quality control and accountability of the statistical model development methods. Governmental regulations may relate to fairness and equal application of the statistical models across business problems involving disparate customer populations, demographic groups, income levels, and the like. Another purpose for storing of information associated with the development of the statistical models may include reduction of redundancy and increasing efficiency of creation of other models. Monitoring and documentation of analysis performed, for instance, using variables and relationships amongst the variables during development of a given statistical model may allow efficient usage of the analysis in development of other statistical models.

Recordation of information of the statistical model development process as described above may additionally be used for repeating one or more of the steps or for reversion to earlier steps of the statistical model development process at a later time. The recordation may additionally be used for identifying flaws and/or errors later discovered in the statistical model. Additionally, recordation of the information in the information repository 112, 114 allows the recorded information to be accessed by one or more relevant individuals of any of the collaborator user groups, during performance of tasks assigned to the respective individuals, to review development progress and/or implementation status of the statistical models, and the like.

Referring again to FIG. 2, at the completion of the model design step 204 described above, the development process may proceed to an approval, or "signoff" step, at 206. The signoff step 206 may be performed by, for example, one or more individuals within the model quality reviewer user group. The signoff step 206 may include, for instance, performance of tasks such as examination of development progress during the model design step 204, substitution of one or more values into statistical model equations, running of statistical model simulations, and the like. The one or more individuals within the model quality reviewer user group may, for instance, evaluate one or more of the tasks performed during the statistical model design step, at 204, assess a quality of performance of the one or more tasks, and indicate an approval or lack of approval of that performance.

In an exemplary embodiment, the approval or lack of approval may be indicated by the individual of the model quality reviewer user group, for instance, through a screen presented by the statistical model management software application. When additional information is required prior to indication of approval or lack of approval, the additional information may be requested by communication facilitated by the statistical model management software application, for instance with one or more other individuals. The request may include a description of the additional information required, and results of the signoff may be stored to the information storage repository 112, 114, for example, by the statistical model management software application.

In an exemplary embodiment, the information analyzed may be presented to the model quality reviewer user group by the statistical model management software application, and signoff responses may be collected from the model quality reviewer user group by the statistical management software application. The presentation and collection may be facilitated by use of a graphical interface, as described below.

Additionally, the signoff step 206 may include examination of documentation relating to model logic and/or model methodology associated with the model design tasks of step 204. The documentation may include, for example, graphical illustrations, text descriptions, white papers, experimental data results, progress logs, reports, and the like. The signoff step 206 may be performed by a single member of the model quality reviewer user group, or by a plurality of individuals of the model quality reviewer user group working independently or collaboratively. When the signoff step 206 determines accuracy and correct performance of each of the model design tasks, the process may continue to a data exploration step 208. When the signoff step 206 determines that any of the tasks included in the model design step were performed incorrectly, and/or the model design step included inaccuracies, the process may revert to step 204.

At a completion of the signoff step 206, information and/or metadata associated with the signoff step tasks is stored to the storage repository at step 230. In an exemplary embodiment, the information associated with the signoff step 206 may include identification information of one or more collaborators, such as the individuals of the model quality reviewer user group performing the signoff step 206, identification of documentation information associated with the statistical model developed to that point, a time and/or date of performance of the signoff step 206, and the like, time and date of submission of the statistical model for approval, time and date of grant or refusal of approval, locations of submission and/or approval, and any other relevant information suitable for describing and recording performance of the approval tasks. Such a record of performance of the approval tasks may serve to provide a developmental record for auditing of the development of the statistical model at a later date.

Upon a successful completion of the signoff at step 206, the statistical model development process may continue to the data exploration step at step 208. The data exploration step 208 may include analysis and review of, for instance, one or more collected data samples, a time period of data collected, distributions of variables, missing values, data transformations, and/or definitions of all variables. The data exploration may additionally include verification by the individual of the model quality reviewer user group that the model builder fully understands the data to be used during statistical model construction. Output of the data exploration step 208 may include a report describing distributions of the variables (e.g., maximum, mean, minimum, etc.), how much missing data exists, any special issues related to the data, and the like.

After successful completion of the data exploration step 208, all information and/or metadata associated with performance of the data exploration step 208 may be recorded to storage repository at step 230, and the statistical model development process may proceed to another signoff step at 210.

The data, along with any information used during the data exploration may be entered into the statistical model management software application, processed by that application, and recorded to the storage repository 112, 114. The statistical model management software application may be run on the computer system 108 of the entity 102, and may be accessed through the communication network 120. In an exemplary embodiment, the access may be performed by using one or more of the remote terminals 130*a*-130*n*. Alternatively, the access may be performed via any suitable communication device capable of communication with the computer system 108 via the network 120.

The information entered into the information repository 112, 114 may be accessible by any of the individuals included in the plurality of user groups. The information repository 112, 114 may therefore serve as a central location for information used by any of the individuals that design and/or implement the statistical model. For instance, individuals of the model owner group may access the stored data exploration information, and use the accessed information to perform other model development steps, such as model design, model selection, and final model approval. Additionally, individuals of the model owner group may access the stored data exploration information through the statistical model software application to perform signoff steps of the statistical model development process.

The signoff step 210 may be similar to the signoff of step 206, and may include a review and verification of performance of all required tasks, production and content of required documentation, validity of any logic utilized, accuracy of any information utilized, accuracy of analysis, and the like associated with the data exploration step 208. When the review and/or verification of signoff step 210 determines that required information is missing or inaccurate, or that tasks were performed incorrectly, the process may revert to step 208. When the signoff step 210 determines that the data exploration step 208 was performed correctly, the statistical model development process may proceed to model selection at step 212.

After completion of the signoff step 210, information and/or metadata associated with performance of the signoff step 210 may be recorded to the storage repository 112, 114 at step 230.

The information may be entered into the statistical model management software application, processed by that application, and recorded to the storage repository 112, 114. The statistical model management software application may be run on the computer system 108 of the entity 102, and may be accessed through the communication network 120. In an exemplary embodiment, the access may be performed by using one or more of the remote terminals 130a-130n. Alternatively, the access may be performed via any suitable communication device capable of communication with the computer system 108 via the network 120.

The signoff information entered into the information repository 112, 114 may be accessible by any of the individuals included in the plurality of user groups. The information repository 112, 114 may therefore serve as a central location for information used by any of the individuals that design and/or implement the statistical model.

In an exemplary embodiment, the model selection step 212 may include, for instance, tasks associated with narrowing a large set of potential variables to a smaller set of one or more suitable variables for inclusion within the statistical model.

Figure 3:
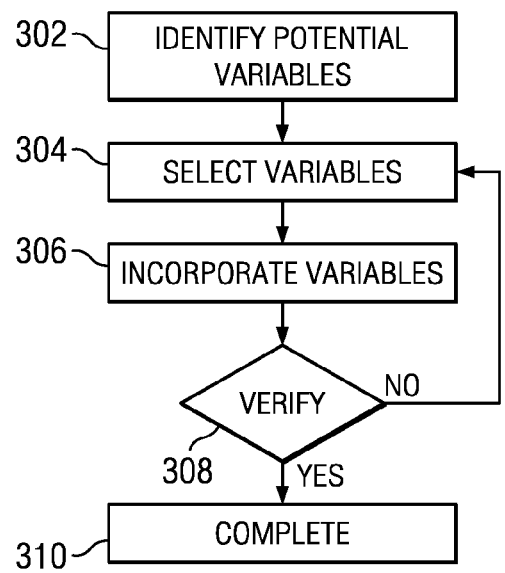
FIG. 3 is a flow diagram illustrating an exemplary method for selecting a model according to the exemplary embodiments of the present application.

Referring now to FIG. 3, in an exemplary embodiment, the statistical model selection step 212 may include identification of a large set of potentially-relevant variables that may be included within the model, at step 302. One or more relevant variables may be selected from the large set of potentially-relevant variables at step 304. The one or more selected variables may be incorporated into the statistical model under development at step 306, and the statistical model including the one or more newly-selected variables may be verified at step 308. When the verification step indicates that one or more additional variables may be required, or that one or more of the selected variables are not suitable for inclusion within the statistical model, the process may return to step 304, and steps 304, 306, and 308 may be repeated.

In an exemplary embodiment, the model selection may include evaluation of one or more sets of possible input variables, to determine whether the variables increase the predictive power of the model. For example, variables that have lower predictive power may be discarded, and variables with the greater predictive power may be selected for inclusion into the final constructed model. The selection, incorporation, and verification steps may be iterated several times, and thereby a smaller set of relevant variables may be selected from the larger set of potential variables and incorporated into the statistical model. Additionally, the model selection may include review of actual model source code for proper syntax, commenting, and structure. The criteria used to judge the predictive power of the model may be determined as well.

When the verification step 308 indicates that all selected variables are suitable for inclusion and that no additional variables are required, the process may be completed at step 310, and the statistical model development process may proceed to an additional signoff at step 214. Exemplary tasks included in the signoff step 214 may be substantially similar to the tasks included in signoff steps 206 and 210, and may include verification of accuracy and completeness of all required tasks, review of logic and/or equations derived, production of accurate documentation, and the like.

After successful completion of the model selection step 212, all information associated with the model selection may be recorded to the storage repository 112, 114 at step 230, and the statistical model development process may proceed to another signoff step at 214.

The information may be entered into the statistical model management software application, processed by that application, and recorded to the storage repository 112, 114. The statistical model management software application may be run on the computer system 108 of the entity 102, and may be accessed through the communication network 120. In an exemplary embodiment, the access may be performed by using one or more of the remote terminals 130a-130n. Alternatively, the access may be performed via any suitable communication device capable of communication with the computer system 108 via the network 120.

The model selection information entered into the information repository 112, 114 may be accessible by any of the individuals included in the plurality of user groups. The information repository 112, 114 may therefore serve as a central location for information used by any of the individuals that design and/or implement the statistical model. For instance, individuals of the model owner group may access the stored model selection information, and use the accessed information to perform other model development steps. Additionally, individuals of the model owner group may access the stored model selection information through the statistical model software application to perform signoff steps of the statistical model development process.

Upon successful completion of the signoff step 214, the statistical model development process may continue to a final approval review, or a final signoff step, at 216. The final approval review step 214 may include, for instance, a comprehensive review of each of the tasks performed during the problem definition step 202, model design step 204, data exploration step 208, and model selection step 212, as well as a review of correct performance and required participation of each relevant collaborator during each of the signoff steps 206, 210, and 214.

When the review of the final approval review step 216 determines that each of the reviewed steps have been performed correctly and do not include inaccuracies or errors, the process may continue to a signoff step 218. When the review of the final signoff step 216 determines an existence of any errors or inaccuracies, the process may revert to step 212. Alternatively, When the review of the final approval review step 216 determines an existence of any errors or inaccuracies in any previously-performed step, the process may revert to the respective step that has been determined to contain the inaccuracy or error.

The signoff step 218 may, for instance, include a review to determine that each of the review tasks of the final signoff step 216 have been performed correctly and accurately. When any errors or inaccuracies are determined by the signoff step 218, the process may revert to step 216.

In an exemplary embodiment, each of the steps of the statistical model development process may be performed through utilization of the model management system 100, for example, by interaction of the respective model owner, model quality reviewer, and/or other user groups with the statistical model software application and/or software modules of the statistical model software application. The software application and/or modules may run, for example, on the remote terminals 130a-130n. Alternatively, the software application and/or modules may run on the computer system 108, and may be accessed via the remote terminals 130a-130n or via another computerized application. The access may be performed, for instance, through a graphical interface rendered using a conventional web browser software application.

In an exemplary embodiment, access to the statistical model management system 100 and statistical model management software application may be provided via the network 120, and the network 120 may include a public communications network such as the Internet. Accordingly, each collaborator may access the statistical model management system 100 via any communications device that is connected to a public communication network such as the Internet.

Figure 4:
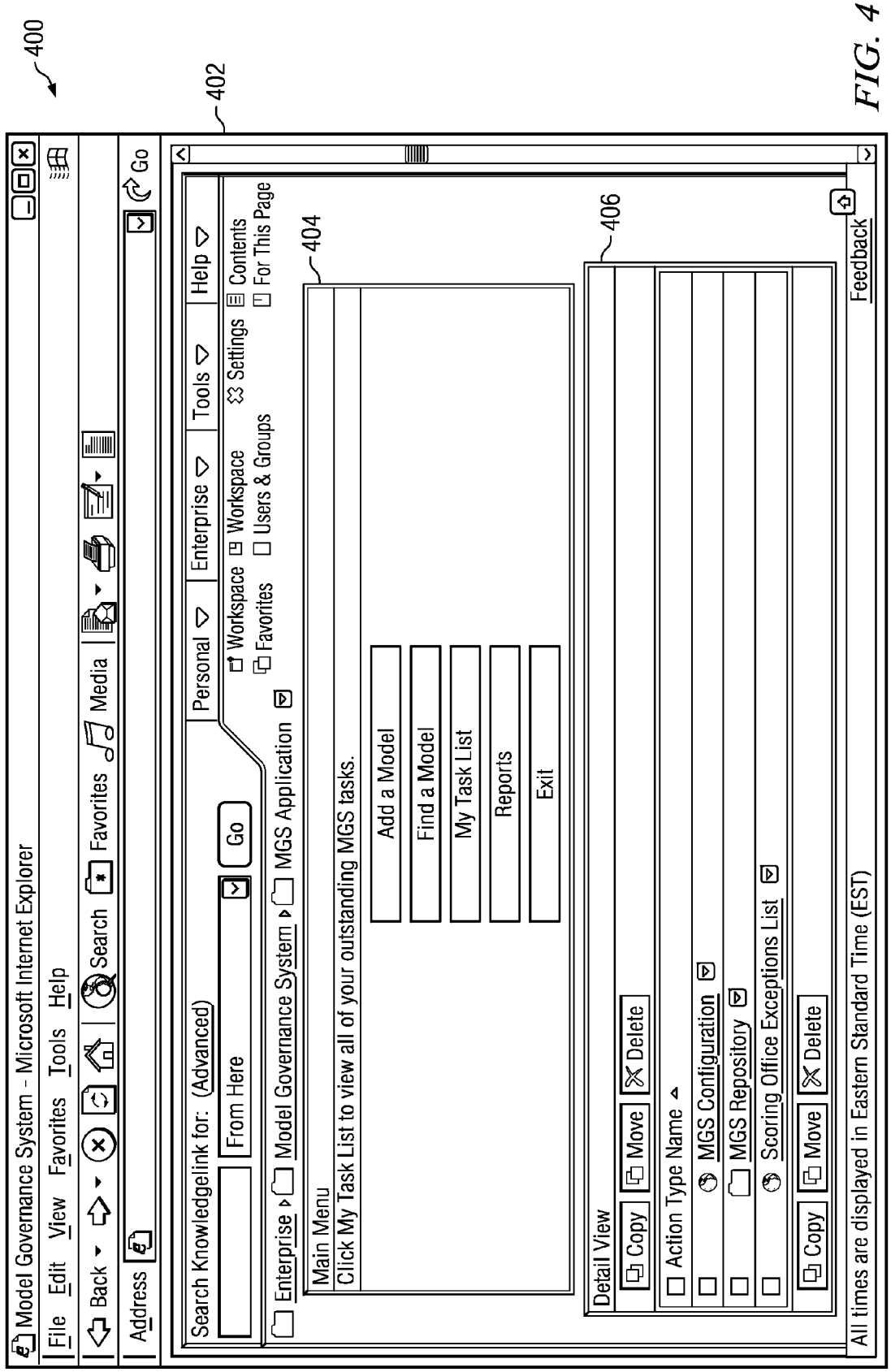
FIG. 4 is a diagram illustrating a model management system interface according to the exemplary embodiments of the present application.

Referring to FIG. 4, an exemplary graphical interface 400 operable for interacting with the statistical model management system 100 may include a web browser software application, in a form of a graphical browser window 402 that renders graphical information. The browser window 402 may display one or more text and/or graphical icons providing links to functionality of the statistical model management system. For instance, one or more text and/or graphical icons may be displayed in a main menu portion 404 of the browser window, and the text and/or graphical icons may provide access to functionality such as adding a new model to the statistical model management system, searching for a statistical model, viewing a list of tasks, viewing reports and/or documentation, and exit. A detail view menu section 406 may additionally be provided within the browser window 402, and the detail view menu may provide access to any suitable additional functionality with respect to the statistical models consistent with the management functions described herein.

Operation of the graphical interface 400 may require a log-in and/or other authentication procedure, and the functionality accessible through the graphical interface 400 may differ depending upon, for instance, which user group the collaborator operating the graphical interface 400 is a member of.

The functionality displayed via the graphical interface 400 may include any function and/or operation associated with managing the statistical models. For instance, individuals of the model quality reviewer user group may retrieve required information associated with each statistical model development process step via the graphical interface 400, and may perform corresponding signoff step tasks through entry of information via the graphical interface 400, or through operation of suitable text or graphical elements displayed on the graphical interface 400. Additionally, the respective model owners may enter all relevant statistical model information, metadata, documentation, and the like via the graphical interface 400.

As will be understood by one skilled in the art, the graphical interface 400 may alternatively include other suitable graphical or textual interfaces, and is not limited to a web browser software application. Furthermore, the graphical interface 400 window described above is merely exemplary, and may be configured to display any suitable text and/or graphical elements or to provide access to any functionality of the statistical model management system 100.

In an exemplary embodiment, for instance, the graphical interface 400 may provide links to access all information, metadata, and documentation associated with any statistical model managed by the statistical model management system 100. Such information may include, for example, information stored to the information repository 112, 114 during performance of the model development process as described above. Additionally, such information may be accessible at any point in time during the development and/or utilization of the statistical model, thereby allowing a status of progress of each statistical model to be conveniently tracked by relevant collaborators.

Additionally, status of performance of each of the signoff or approval steps may similarly be monitored and/or tracked by relevant collaborators through the graphical interface 400. In an exemplary embodiment, for instance, all information associated with signoff steps such as identification of individuals of the model quality reviewer user group, dates, times, locations, and the like may be accessible through the graphical interface 400. Further, the signoff information may be conveniently retrieved via queries to the repository delivered by and displayed via the graphical interface 400 in a plurality of categories, such as signoff information associated with particular statistical models, signoff information associated with particular individuals of the model quality reviewer user group and/or model owner user group, signoff information of particular dates and/or times, and the like.

Status information associated with the statistical model may be presented to each relevant collaborator via the graphical interface 400. For instance, progression of each of the development process steps may be displayed to each relevant collaborator via the graphical interface 400. The communication may include textual or graphical indications presented to each collaborator, such as icons, graphs, text, and graphic elements, and the indications may indicate a progress of development of the statistical model.

In an exemplary embodiment, the statistical model management system 100 may produce and/or deliver notification messages related to a status of the statistical model or to outstanding tasks required to be performed, and may deliver the notification messages to each relevant collaborator via the graphical interface 400. The messages may alternatively be in the form of electronic mail messages, and may be delivered via an independent electronic mail delivery system, via a short message system ("SMS"), a personal digital assistant ("PDA"), and the like through communication with the statistical model management system 100 via the communication network 120. The messages may include development status of the statistical model, implementation status of the statistical model, and the like, and may describe pending and/or required steps associated with the statistical model.

The notification messages produced and/or delivered by the statistical model management system may additionally provide notification to particular collaborators to inform the particular collaborators of outstanding tasks that require attention. In an exemplary embodiment, for instance, notification messages in the form of electronic mail messages may be generated and delivered to each collaborator, and may contain information related to any development of or modifications performed to the statistical model, identification information of collaborators that are associated with the statistical model, date and/or time information of any development or modification tasks performed on the statistical model, and the like. The electronic messages may additionally include information associated with tasks requiring completion or attention of the respective collaborator. The messages may be configured to be operable to warn the collaborator that required items have not been completed, to inform a relevant collaborator of important deadlines for performance of tasks, and the like.

Figure 5:
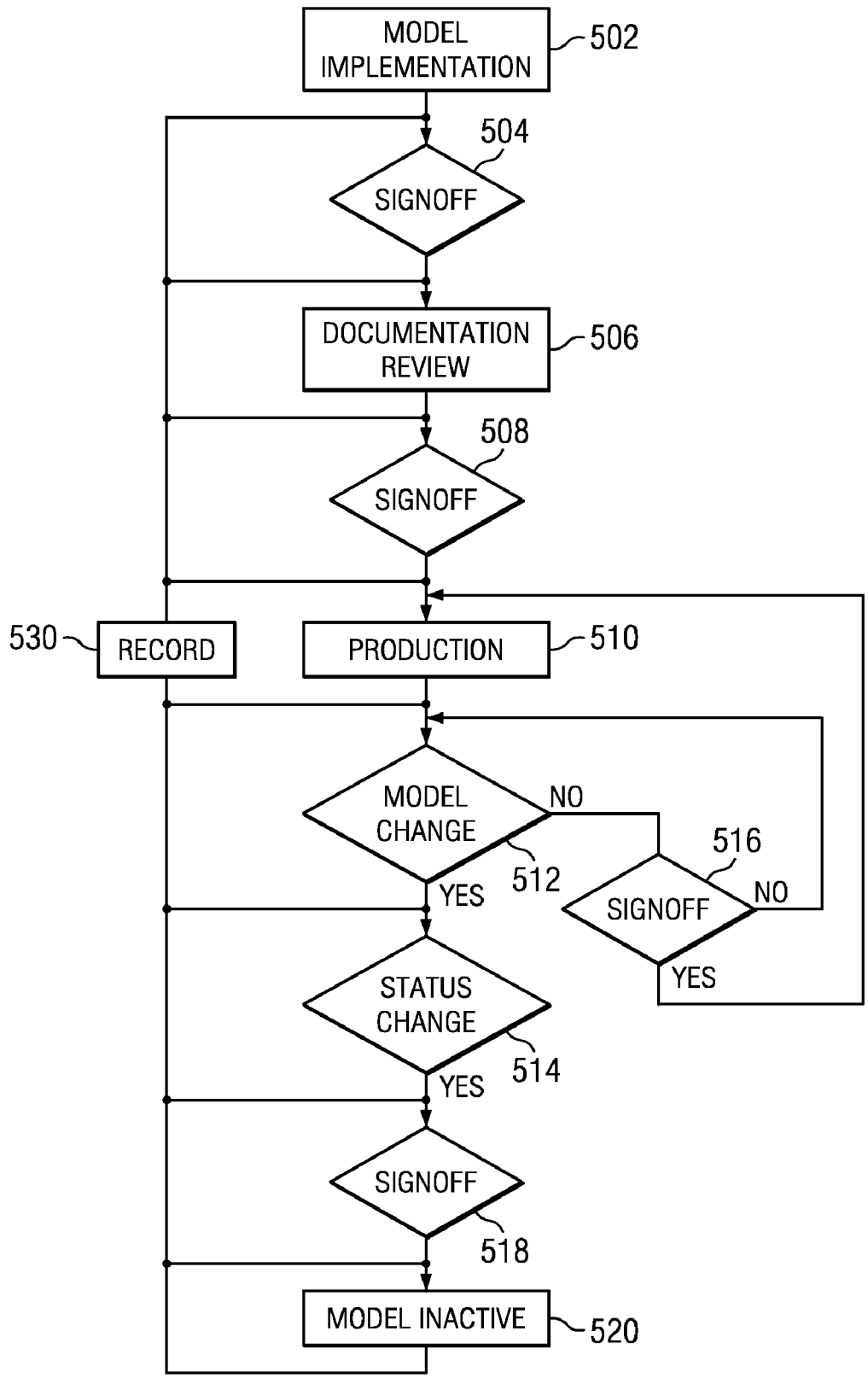
FIG. 5 is a diagram illustrating an exemplary method for management of a model in production according to the exemplary embodiments of the present application.

In an exemplary embodiment, subsequent to a successful completion of the statistical model development process, the developed statistical model may be utilized in a production environment. Referring to FIG. 5, utilization of the statistical model in a production environment may begin with implementation of the statistical model at step 502.

In an exemplary embodiment, the implementation step 502 may be performed by one or more individuals of the implementer user group, and may include tasks related to integrating the statistical model with production devices, systems, and networks. Additionally, relevant information associated with the implementation step may be stored to the information repository 112, 114 at step 530.

The implementation may include submission of statistical model code to one or more production systems on which the statistical model will be implemented, and validation of the code on the one or more production systems to ensure that the statistical model works as designed. Results of the validation of the code on the production system (e.g., comparison of expected values to calculated values) may be reviewed by an individual of the model quality reviewer user group, and may be stored to the information storage repository 112, 114.

In an exemplary embodiment, the statistical model management software application may optionally have an ability to transmit the statistical model code directly to the production system without human intervention. Alternatively, individuals responsible for loading the statistical model on the production system may obtain the statistical model information from the statistical model management software application, for instance by downloading. Once implemented, the model may interact with the statistical model management software application during the monitoring step. The model may be monitored for performance, and results of the performance monitoring may be loaded to the statistical model management software application, for instance, manually.

After completion of the implementation step 502, the utilization process may continue to a signoff step 504, and the signoff step 504 may be performed by one or more individuals included in the model quality reviewer user group. In an exemplary embodiment, the tasks included in the signoff step 504 may be similar to the signoff steps 206, 210, 214, and 218 described above, and may include review and analysis of tasks of the implementation step 502 for accuracy and/or checking for a presence of required documentation. Upon completion of the signoff step 504, relevant information associated with the signoff step may be stored to the information repository 112, 114 at step 530.

The utilization process may continue to a documentation review step 506. In an exemplary embodiment, the documentation review step 506 may include review and analysis of all documentation associated with the statistical model that has accrued throughout the statistical model development and utilization processes. The documentation review may additionally include verification that the documentation accrued is sufficient to allow complete replication of the statistical model development and utilization processes, as well as to allow compliance with applicable organizational and governmental regulations. The process may continue to another signoff step at 508. Upon successful completion of the signoff step 508, the statistical model may be placed into production at step 510, and may be periodically monitored while in production.

In an exemplary embodiment, the documentation review of step 506 may be performed by one or more individuals of the model quality reviewer user group. The documentation review of step 506 may include a final check of documents, for example documents loaded via the statistical model management software application, to ensure that the documentation developed during the construction of the statistical model is complete, accurate, understandable, and well-organized.

In an exemplary embodiment, the monitoring of the model in production may be performed by one or more individuals of the model owner user group and/or of the model owner champion user group. The monitoring may be designed to detect whether the statistical model is operating as designed, and may be performed periodically, at a predetermined frequency, such as daily, weekly, monthly, quarterly, annually, and the like. The monitoring may include analysis of information associated with operational results, data, and the like of the statistical model. The monitoring may also include tracking implementation locations, business problems, and collaborators associated with the statistical model. Acceptable operation of the statistical model may include, for instance, accurate prediction of outcomes based on the characteristics of the subjects currently being scored by the statistical model.

The statistical model monitoring may include collection by the individual of the model owner user group of data on which to perform the monitoring, performance of required calculations to produce a set of diagnostic metrics, and production of reports for review by an individual of the model quality reviewer user group showing that the statistical model is still working as intended. When the diagnostic metrics show the statistical model is not working as intended, the model owner individual may determine a root cause of the faulty performance, and report information describing the root cause to the model quality reviewer individual. Upon receipt and analysis of the root cause information, a decision may be made to change the statistical model, retire the statistical model, or continue monitoring the statistical model.

Additionally, the statistical model management system 100 may be integrated with the production environment, such that status information regarding the statistical model in use, such as errors, problems, comments, and the like, may be entered via production systems, and associated with the statistical model information managed and stored by the statistical model management system 100.

Information associated with the monitoring of the statistical model in production may be stored to the information repository 112, 114, for example, periodically at a frequency similar to the frequency of performance of the monitoring. In an exemplary embodiment, the information stored may include statistical model and collaborator identification information, variable values, rates of success and/or failure of implementation of the statistical model, and the like.

The monitoring of the statistical model in production may be operable to enhance accountability, efficiency, and proper operation of the model as intended. Furthermore, tracking of the statistical model in production may be required by applicable organizational and/or governmental regulations to ensure accuracy, fairness, and equal application of the model across customer populations.

While in production, the statistical model may be changed or modified. In an exemplary embodiment, model change step 512 may determine whether a change may be required. When a change is required, the process may determine whether the change is a change in status of the statistical model, for instance, from a production status to an inactive status. When the change includes a change in status of the statistical model, the process may proceed to a signoff step at step 516, and to a change in status at step 520. When no change in the statistical model is required, the statistical model may continue in an active status and may continue to be monitored periodically.

The changes to the statistical model may additionally include, for instance, additions, deletions, or substitutions of equations and/or variables. When changes are performed, the statistical model management system 100 may generate and deliver notification messages to inform the relevant collaborators associated with the statistical model of the changes, and the messages may be delivered through the graphical interface 400, via electronic mail, and the like.

In an exemplary embodiment, the modifications may be performed by an individual of the model owner user group. A need for modification may be determined during the statistical model monitoring, and may arise when conditions change such that the model no longer works as intended, or when the business need changes. Modifications may include deletion of a variable, modification of variable coefficients, correction of flaws discovered after implementation, and any other changes needed to improve the performance of the statistical model.

In an exemplary embodiment, the statistical model management system 100 as described above may further produce reports, white papers, and/or documentation regarding the development, composition, function, and/or performance of the statistical models. Information may be stored to the information repository 112, 114 at a completion of each step in the development and utilization of the statistical model, as described above. The stored information may be organized, indexed, and structured, for instance, using one or more database software applications. In an exemplary embodiment, the storage and organization of the information associated with the statistical model may allow the statistical model management system 100 to assemble, generate, and deliver documentation on the statistical model at any point in the development and utilization processes. The documentation may include, for instance, performance statistics, white papers, lists of collaborators, lists of performance of significant development and utilization tasks, lists of changes to the statistical model, production results, and the like. The generated documentation may be accessible, for instance, via the graphical interface 400, or may be deliverable via electronic message, paper printouts, or otherwise.

The reports may include information associated with the statistical model, and the information may include description of equations, mathematical relationships, variables, and any other suitable data associated with the statistical model. The information included in the report may additionally include identification and/or metadata associated with the statistical model, such as identification information of one or more collaborators that developed and/or implemented the model, times and/or dates of development of the model, times and/or dates of implementation of the model, implementation result information, and the like. The generated reports may be in any suitable graphical or file format, and may include charts, figures, and/or tables to present the report information.

In an exemplary embodiment, the statistical model management system 100 may gather and collate information stored in the storage repository to generate reports specific to a particular collaborator, to a particular statistical model, to a particular date or range of dates, to a particular business problem, and the like. The report generation may be automatically performed by the statistical model management system 100, or may be assembled through input and/or instruction of one or more collaborators.

As will be understood by one skilled in the art, the present application is not limited to the precise exemplary embodiments described herein and that various changes and modifications may be effected without departing from the spirit or scope of the application. For example, elements and/or features of different illustrative embodiments may be combined with each other, substituted for each other, and/or expanded upon within the scope of the present disclosure and the appended claims. In addition, improvements and modifications which become apparent to persons of ordinary skill in the art after reading the present disclosure, the drawings, and the appended claims are deemed within the spirit and scope of the present application.

What is claimed is:

1. A method for managing development of a model, comprising:
    accessing by a plurality of users a processing unit operable for the development of the model;
    receiving at the processing unit a plurality of model development instructions from the plurality of users;
    developing the model in a plurality of steps using the plurality of model development instructions;
    receiving at the processing unit a plurality of signoff instructions corresponding to the plurality of steps for developing the model, each of the plurality of signoff instructions being received at the processing unit after the corresponding one of the plurality of steps is performed and each of the plurality of signoff instructions indicating whether the respective step is approved or denied;
    approving by the processing unit a respective step if the corresponding signoff instruction indicates approval; and
    rejecting by the processing unit the respective step if the corresponding signoff instruction indicates denial, wherein
    the processing unit is operable as a central location accessible by the plurality of users for developing, and signing off on the development of, the model according to the plurality of model development instructions and the plurality of signoff instructions.

2. The method of claim 1, wherein
the model is at least one of a predictive statistical model for predicting customer debt repayment, a predictive statistical model for predicting responses to commercial solicitations, or a statistical model for identifying at least one of transaction fraud or identity fraud.

3. The method of claim 1, wherein
the received instructions include one or more equations; and
each of the one or more equations includes one or more variables.

4. The method of claim 1, wherein
the plurality of steps includes a business problem definition step.

5. The method of claim 1, wherein
the plurality of steps includes a model design step.

6. The method of claim 1, wherein
the plurality of steps includes a data exploration step.

7. The method of claim 1, wherein
the plurality of steps includes a model selection step.

8. The method of claim 1, wherein
the plurality of steps includes a final approval review step.

9. The method of claim 1, further comprising:
generating at least one notification message operable to inform at least one of the plurality of users of the indication of each of the plurality of signoff instructions; and
delivering the at least one notification message to the at least one of the plurality of users.

10. The method of claim 1, wherein
the accessing by the plurality of users of the processing unit is performed via a graphical interface rendered by a web browser software application.

11. The method of claim 1, further comprising generating documentation, the documentation including at least one of description information of the model, a description of a business problem associated with the model, and at least one of the plurality of model development instructions.

12. The method of claim 11, wherein
the documentation further includes at least one of identification information of the plurality of users, a time and date of access of each of the plurality of users, a time and date of receipt of the plurality of model development instructions, a time and date of receipt of the plurality of signoff instructions, approval or denial indication information of each of the plurality of signoff instructions, and a time and date of approval or rejection of each of the respective steps.

13. A computer-implemented method for management of a model, comprising:
accessing by a plurality of users a processing unit operable for the management of the model;
receiving at the processing unit model implementation information;
receiving at the processing unit model documentation review information;
receiving at the processing unit a plurality of signoff instructions corresponding to each of the implementation information and the documentation review information;
approving by the processing unit an implementation of the model if the corresponding signoff instruction indicates approval, and rejecting by the processing unit the implementation if the corresponding signoff instruction indicates denial;
approving by the processing unit a utilization of the model if the corresponding signoff instruction indicates approval, and rejecting by the processing unit the utilization if the corresponding signoff instruction indicates denial, wherein
the processing unit is operable as a central location accessible by the plurality of users for implementing and utilizing, and signing off on the implementation and utilization of, the model according to the implementation information, the documentation review information, and the plurality of signoff instructions.

14. The method of claim 13, wherein
the model is at least one of a predictive statistical model for predicting customer debt repayment, a predictive statistical model for predicting responses to commercial solicitations, or a statistical model for identifying at least one of transaction fraud or identity fraud.

15. The method of claim 13, further comprising:
receiving at the processing unit model monitoring information indicating acceptable model operation, wherein
the model monitoring information is received at least one of daily, weekly, monthly, quarterly, or annually.

16. The method of claim 13, wherein
the implementation information includes model code information.

17. The method of claim 13, wherein
the documentation review information includes documentation associated with construction of the model.

18. The method of claim 13, further comprising:
generating at least one notification message operable to inform at least one of the plurality of users of the indication of each of the plurality of signoff instructions; and
delivering the at least one notification message to the at least one of the plurality of users.

19. The method of claim 13, wherein
the accessing by the plurality of users of the processing unit is performed via operation of a graphical interface rendered by a web browser software application.

20. The method of claim 13, further comprising generating documentation, the documentation including at least one of the implementation information, the document review information, identification information of the plurality of users, a time and date of access of each of the plurality of users, a time and date of receipt of the implementation information, a time and date of receipt of the documentation review information, approval or denial indication information of each of the plurality of signoff instructions, a time and date of approval or rejection of the implementation, and a time and date of approval or rejection of the utilization.

21. A statistical model management system, comprising:
at least one processing unit;
at least one information storage repository;
a statistical model management application running on the at least one processing unit, wherein
the at least one processing unit is operable for the management of the model and is operable to facilitate access by a plurality of users;
receive a plurality of model management instructions from the plurality of users;
manage the model in a plurality of steps using the plurality of model management instructions;
receive a plurality of signoff instructions corresponding to the plurality of steps for managing the model, each of the plurality of signoff instructions being received at the processing unit after the corresponding one of the plurality of steps is performed and each of the plurality of signoff instructions indicating whether the respective step is approved or denied;
approve a respective step if the corresponding signoff instruction indicates approval;
reject the respective step if the corresponding signoff instruction indicates denial; and
the at least one processing unit is operable as a central location accessible by the plurality of users for managing, and signing off on the management of, the model according to the plurality of model management instructions and the plurality of signoff instructions.

* * * * *